US011649344B2

(12) United States Patent
Afriat et al.

(10) Patent No.: US 11,649,344 B2
(45) Date of Patent: May 16, 2023

(54) POLYOLEFIN BASED COMPOSITIONS MODIFIED BY SILANES

(71) Applicant: CARMEL OLEFINS LTD., Haifa (IL)

(72) Inventors: Adi Afriat, Haifa (IL); Michael Gishboliner, Karmiel (IL); Rotem Shemesh, Haifa (IL); Michael Shuster, Nesher (IL)

(73) Assignee: CARMEL OLEFINS LTD., Haifa (IL)

( * ) Notice: Subject to any disclaimer, the term of this patent is extended or adjusted under 35 U.S.C. 154(b) by 0 days.

(21) Appl. No.: 17/621,850

(22) PCT Filed: Jun. 14, 2020

(86) PCT No.: PCT/IL2020/050655
§ 371 (c)(1),
(2) Date: Dec. 22, 2021

(87) PCT Pub. No.: WO2020/261258
PCT Pub. Date: Dec. 30, 2020

(65) Prior Publication Data
US 2022/0204742 A1    Jun. 30, 2022

Related U.S. Application Data (60) Provisional application No. 62/867,297, filed on Jun. 27, 2019.

(51) Int. Cl.
C08L 23/26 (2006.01)
C08J 3/24 (2006.01)
C08J 3/00 (2006.01)
B33Y 70/00 (2020.01)

(52) U.S. Cl.
CPC .............. *C08L 23/26* (2013.01); *C08J 3/005* (2013.01); *C08J 3/247* (2013.01); *B33Y 70/00* (2014.12); *C08J 2323/26* (2013.01); *C08J 2423/12* (2013.01); *C08J 2423/14* (2013.01); *C08L 2201/08* (2013.01); *C08L 2207/20* (2013.01); *C08L 2312/08* (2013.01)

(58) Field of Classification Search
None
See application file for complete search history.

(56) References Cited

U.S. PATENT DOCUMENTS

| | | | | |
|---|---|---|---|---|
| 3,646,155 | A * | 2/1972 | Scott | C08K 5/54 525/288 |
| 6,864,323 | B2 * | 3/2005 | Schlosser | C08F 230/085 525/254 |
| 8,581,094 | B2 | 11/2013 | Patel et al. | |
| 8,945,701 | B2 | 2/2015 | Ikenaga et al. | |
| 2016/0060418 | A1 * | 3/2016 | Tian | B01J 20/265 521/114 |
| 2019/0002615 | A1 * | 1/2019 | Datashvili | C08L 19/00 |

FOREIGN PATENT DOCUMENTS

| | | |
|---|---|---|
| EP | 1925628 A1 | 5/2008 |
| EP | 2294100 | 1/2010 |
| EP | 2740762 A1 | 6/2014 |
| EP | 2821450 A1 | 1/2015 |
| JP | 2004043293 A * | 2/2004 |
| WO | 199506026 A1 | 3/1995 |
| WO | 2009073274 A1 | 6/2009 |
| WO | 2011005852 A1 | 1/2011 |
| WO | 2018078480 A1 | 5/2018 |

OTHER PUBLICATIONS

Product brochure for Dynasylane 6598, 1 page, Downloaded on Sep. 18, 2022.*
Issa et al. (Kinetics of Alkoxysilanes and Organoalkoxysilanes Polymerization: A Review, polymers, MDPI, Basel, Switzerland, Mar. 21, 2019, pp. 1-43.*
Denys Chervakov et al., "Constructional Materials Based on Cross-Linked Polyproplyene Reinforced by Modified Basalt Fibers", Chemistry & Chemical Tehnology, vol. 5, No. 1, 2011, 5 pages.
International Search Report issued in Application No. PCT/IL2020/050655 dated Jul. 27, 2020, 7 pages.
Written Opinion issued in Application No. PCT/IL2020/050655 dated Jul. 27, 2020, 5 pages.
Evonik Industries pamphlet: Silane Crosslinkinig of POLYEYHYLENE (2020), 12 pages.
Torry, S.A. et al., "Kinetic analysis of organosilane hydrolysis and condensation," International Journal of Adhesion & Adhesives 26 (2006) pp. 40-49.

* cited by examiner

*Primary Examiner* — Tae H Yoon
(74) *Attorney, Agent, or Firm* — Cantor Colburn LLP (57) ABSTRACT

A thermoplastic polyolefin composition which is capable of being shaped and repeatedly recycled, comprises propylene-based polymers, said composition being modified with 0.01-5 wt % of organic oligomeric silanes selected from partially hydrolyzed alkoxy substituted vinyl, allyl or meth-acryl silanes, and blends thereof, and 0.0005-0.5 wt % of a compound capable of generating free radicals.

17 Claims, 3 Drawing Sheets

POLYOLEFIN BASED COMPOSITIONS MODIFIED BY SILANES

CROSS REFERENCE TO RELATED APPLICATIONS

This application is a National Stage application of PCT/IL2020/050655, filed Jun. 14, 2020, which claims the benefit of U.S. Provisional Application No. 62/867,297, filed Jun. 27, 2019, both of which are incorporated by reference in their entirety herein.

FIELD OF THE INVENTION

The present invention relates to thermoplastic polyolefin based compositions modified by organic silanes, the compositions may comprise waste or recycled polyolefin materials. Particularly, the present invention relates to thermoplastic polyolefin based compositions comprising a propylene-based polymer, wherein polyolefin macromolecules are at least partially branched or cross-linked by means of organic silanes, such compositions exhibit high melt strength, good mechanical properties, processability and recyclability.

BACKGROUND OF THE INVENTION

Polyolefins are by far most widely used industrial polymers, constituting at least 60% of the world polymer consumption. Beneficial properties of polyolefins include low density, outstanding chemical resistance, reasonably good thermal resistance, attractive mechanical properties and good recyclability. However, the scope of their possible applications is limited by poor compatibility, such as between polypropylene and polyethylene. While polyethylene (PE) exhibits outstanding processability, its heat resistance and mechanical performance are not so good. On the other hand, polypropylene (PP), is characterized by advantageous heat resistance, mechanical strength, and stiffness, but shows inferior melt strength, impeding its processing by certain techniques. Combining the advantages of polypropylene and polyethylene by mixing them would be highly valuable. Such combination seems particularly beneficial for recycling purposes, since plastic waste often contains mixed polyolefins which are difficult to separate. Unfortunately, incompatible polypropylene-polyethylene blends usually show inferior mechanical properties, especially poor impact resistance. Moreover, multiple processing causes PP viscosity to decrease due to molecular weight reduction, while PE viscosity tends to increase and, even, cross-linking may take place. Such opposite tendencies turn recycling of mixed polyolefin waste into an extremely challenging task. It is therefore strongly desirable to provide thermoplastic polyolefin-based compositions combining high melt strength, excellent processability, and recyclability, high heat resistance, good mechanical performance and low density.

It is therefore an object of this invention to provide polyolefin compositions, combining high heat resistance and high melt strength.

It is a further object of this invention to provide polyolefin compositions, combining excellent processability and recyclability, low density, and good mechanical properties.

It is still another object of this invention to provide valuable thermoplastic materials originating from mixed polyolefin waste, which combine good processability, good mechanical properties, and high heat resistance.

This invention aims at providing a process for manufacturing thermoplastic materials combining high melt strength, high temperature resistance, excellent processability and recyclability, from polyolefins and blends thereof, through modification by organic silanes.

This invention also aims at providing injection molded, extruded, or otherwise shaped articles made from silane-modified polyolefins or blends thereof.

Other objects and advantages of present invention will appear as the description proceeds.

SUMMARY OF THE INVENTION

This invention provides a thermoplastic polyolefin composition comprising propylene-based polymers, said composition are modified with 0.01-5% of organic oligomeric silanes and 0.0005-0.5% of a compound capable of generating free radicals. The percent means weight percent throughout the description, unless otherwise explicitly indicated. In one embodiment, said organic silane constitutes between 0.1 and 3.0% of the composition. In another embodiment the thermoplastic composition of the invention comprises 30-99% of propylene-based polymers and 1-70% of ethylene-based polymers, said ethylene-based polymers being at least partially cross-linked by means of said organic silanes. The solubility of said cross-linked ethylene-based polymers in boiling xylene is below 90%. In one embodiment of the invention the organic oligomeric silane is selected from partially hydrolyzed alkoxy substituted vinyl, allyl or methacryl silanes, and blends thereof. Said propylene-based polymer may be selected from polypropylene homopolymers, partially crystalline random copolymers of propylene with ethylene and/or with other alpha-olefins (C4-C10), heterophasic copolymers of propylene with ethylene or other alpha-olefins, and blends thereof. Said ethylene-based polymer may be selected from low density polyethylene, linear low density polyethylene, medium density polyethylene, high density polyethylene, very low density polyethylene, ultra-low density polyethylene, ethylene-propylene rubber, ethylene-propylene-diene rubber (EPDM), ethylene-vinyl acetate copolymers, and ethylene-acrylate copolymers, and blends thereof. The thermoplastic composition may comprise mixed polyolefin waste, said waste comprising propylene-based polymers and ethylene-based polymers, wherein the ethylene-based polymers are at least partially cross-linked by means of organic silanes. The composition of the invention may further comprise additives selected from fillers, antioxidants, lubricants, colorants, plasticizers, extenders, acid scavengers, antistatic agents, and light stabilizers, or combinations thereof. The compositions of the invention exhibit low density, high melt strength, high heat resistance, and good mechanical properties, and are capable of being shaped and repeatedly recycled.

In one aspect, the invention relates to a process of manufacturing a thermoplastic polyolefin composition comprising propylene-based polymers, which is modified with 0.01-5% of organic oligomeric silanes selected from partially hydrolyzed alkoxy substituted vinyl, allyl or methacryl silanes, and blends thereof, and 0.0005-0.5% of compounds capable of generating free radicals, comprising the steps of
i) providing a propylene-based polymer and, optionally, an ethylene-based polymer and melting said polymers;
ii) adding to the molten mixture of step i) an organic silane selected from oligomeric alkoxy substituted vinyl, allyl or methacryl silanes, and blends thereof in the amount of 0.01 to 5%;

iii) adding to the molten mixture of step i) a free radical generating compound selected from organic peroxides, organic nitroxides, and organic compounds containing labile carbon-carbon bonds, or combinations thereof, in an amount of from 0.0005% to 0.1%;

iv) mixing the molten components at a temperature of between 200 and 290° C., thereby obtaining a thermoplastic polyolefin composition modified by organic silane; and v) cooling and pelletizing or shaping the mixture; thereby obtaining a thermoplastic polyolefin composition exhibiting excellent processability and recyclability.

The thermoplastic polyolefin composition comprises in one embodiment 30-100% of propylene-based polymers and 0-70% of ethylene-based polymers, wherein the ethylene-based polymers are at least partially cross-linked by means of organic silane. The process may further comprise adding in step iii) cross-linking agents selected from inorganic acids, carboxylic acids, sulfonic acids, and blends thereof. Such cross-linking agents are preferably selected from adipic acid, maleic acid, phthalic acid, and boric acid. The process may further comprise adding in step iv) additives selected from fillers, antioxidants, lubricants, colorants, plasticizers, extenders, acid scavengers, antistatic agents, and light stabilizers. In a specific embodiment, the molten mixture of propylene-based polymers and ethylene-based polymers comprises mixed polyolefin waste, selected from post-consumer waste, post-consumer packaging, an industrial production scrap, scrap originating from injection molded parts, from bi-component fibers, and from multilayer films. The manufacturing process may be performed batch wise. Said manufacturing process may be performed continuously using a co-rotating twin-screw extruder. Step v) may comprise extrusion, compression molding, injection molding, thermoforming, fiber spinning, or 3D-printing.

The invention also encompasses shaped products, made of thermoplastic polyolefin compositions comprising at least 30% of propylene-based polymers, modified by organic silane, constituting at least 0.01% of the compositions, exhibiting high heat resistance and good mechanical properties, which are capable of being recycled. The products may be shaped as filaments, pellets, sheets, molded and thermoformed articles, films, pipes, tubes, or hollow articles.

BRIEF DESCRIPTION OF THE DRAWINGS

The abovementioned and other characteristics and advantages of the invention will be more readily apparent through the following examples, and with reference to the appended drawings, wherein.

DETAILED DESCRIPTION OF THE INVENTION

In one aspect the present invention provides thermoplastic compositions, comprising propylene-based polymers, modified by organic silanes. Such modification significantly affects the melt rheology of the compositions, possibly due to branching. Such compositions demonstrate high melt strength, low density and high heat resistance. In another aspect the present invention provides a thermoplastic composition consisting of a polyolefin blend comprising propylene-based polymers and ethylene-based polymers, wherein the ethylene-based polymers are at least partially cross-linked by means of organic silanes. Such compositions reveal two-phase structure, wherein the ethylene-based polymers form a phase, finely dispersed in the propylene-based polymer matrix. Such compositions exhibit high heat resistance, low density, good mechanical properties and excellent processability and recyclability.

In still another aspect the present invention provides thermoplastic compositions comprising polyolefin waste, consisting of propylene-based polymers and ethylene-based polymers, wherein the ethylene-based polymers are at least partially cross-linked by means of organic silanes. Such compositions, having two-phase structure with the ethylene-based polymer being finely dispersed in propylene-based polymer matrix, demonstrate high heat resistance and good mechanical properties, suitable for manufacturing high quality durable goods.

The compositions of the present invention comprise propylene-based polymers and an organic silane. Optionally such compositions comprise ethylene-based polymers, cross-linking agents and additives. Additionally, the compositions of the present invention initially comprise compounds, capable of generating free radicals. Such radicals are necessary for bonding organic silanes to polymer macromolecules. The radicals generating compounds, decompose and disappear during the manufacturing process of the compositions, consequently the final compositions do not contain them.

For the purpose of the present invention term "propylene-based polymers" (PP) means polymers of propylene or its copolymers with ethylene and/or other alpha-olefins (C4-C10), comprising at least 60 molar percent of propylene monomer units and having a density close to 900 kg/m$^3$, or blends thereof. Particularly, propylene-based polymers of the present invention include polypropylene homopolymers, partially crystalline random copolymers of propylene with ethylene and/or with other alpha-olefins (C4-C10), heterophasic copolymers, comprising semicrystalline propylene homopolymer or random copolymer and predominantly amorphous rubber-like statistical propylene—alpha olefin copolymer, or blends thereof.

For the purpose of the present invention, the term "ethylene-based polymers" (PE) means any polymer or copolymer of ethylene, comprising at least 50 molar percent of ethylene units and having a density of from 850 to 970 $kg/m^3$. Particularly, ethylene-based polymers of the present invention include, but are not limited to, low density polyethylene (LDPE), linear low density polyethylene (LLDPE), medium density polyethylene (MDPE), high density polyethylene (HDPE), very low density polyethylene (VLDPE), ultra-low density polyethylene (ULDPE), ethylene-propylene rubber, ethylene-propylene-diene rubber (EPDM), ethylene—vinyl acetate copolymers (EVA), ethylene—acrylate copolymers, and blends thereof.

Organic silanes of the present invention are any partially hydrolyzed alkoxy-substituted vinyl, allyl or methacryl silanes, and blends thereof.

Compounds, capable of generating free radicals, for the purpose of the present invention comprise organic peroxides, organic nitroxides, organic compounds, containing labile carbon-carbon bonds etc.

Cross-linking agents of the current invention are functional compounds with acidic functionality, capable of inducing fast condensation of alkoxy-substituted silanes at temperatures above melting point of propylene polymers. Particularly, cross-linking agents of the present invention include inorganic acids, carboxylic acids, sulfonic acids and blends thereof. More specifically, preferable cross-linking agents include multifunctional acids, like adipic, maleic, phthalic and boric acids.

Thermoplastic compositions according to the present invention may optionally comprise additives. Such additives include, but are not limited to, fillers, antioxidants, lubricants, colorants, plasticizers, extenders, acid scavengers, antistatic agents, light stabilizers.

The process for manufacturing thermoplastic composition of the present invention comprises providing propylene-based polymers, ethylene-based polymers, organic silanes, compounds capable of generating free radicals, cross-linking agents and additives in the proportions and order of addition, specified further in this description, melting the polymer components, and thorough mixing the composition, using any suitable mixing device, under the conditions specified further in the description.

Compositions of the Invention

The thermoplastic compositions of the present invention are multicomponent materials, comprising at least one propylene-based polymer and at least one organic silane.

Optionally, thermoplastic compositions of present invention comprise ethylene-based polymers, cross-linking agents and additives. Initially such compositions comprise free radicals generating compounds, however such compounds decompose generating free radicals and then disappear, so, final thermoplastic compositions of the present invention do not contain them.

In one embodiment, thermoplastic compositions of the present invention initially comprise propylene-based polymers, organic silanes, and free radical generating compounds. Optionally, such compositions comprise cross-linking agents and additives. Finally, such compositions comprise propylene-based polymers, which are modified with bonded organic silane. Optionally, bonded organic silane moieties of such compositions undergo silanol condensation, while the final composition remains thermoplastic. Such compositions exhibit low density, high melt strength, high heat resistance and good mechanical properties. Such compositions may be shaped by a variety of techniques suitable for thermoplastic polymers and allow multiple recycling.

In another embodiment, thermoplastic compositions of the present invention initially comprise propylene-based polymers, ethylene-based polymers, organic silanes and free radical generating compounds. Optionally, such compositions comprise cross-linking agents and additives. Finally, such compositions comprise propylene-based polymers, and ethylene-based polymer, whereas ethylene-based polymers are at least partially cross-linked by means of bonded organic silane. Optionally, bonded organic silane moieties of such compositions undergo silanol condensation, while the final composition remains thermoplastic. Such compositions exhibit low density, high melt strength, high heat resistance and good mechanical properties. Such compositions may be shaped by a variety of techniques suitable for thermoplastic polymers and allow multiple recycling.

In still another embodiment, thermoplastic compositions of the present invention initially comprise mixed polyolefin waste, comprising propylene-based polymers and ethylene-based polymers. Said mixed polyolefin waste may be from any source—industrial scrap or post-consumer waste. Such waste may also comprise additional polymer components. The examples of such waste may be, but are not limited to, mixed industrial production scrap, originated from injection molded parts, bi-component fibers, multilayer films, post-consumer packaging. Such waste should be essentially free from contaminants (e.g. metals, soil, sand) and in some instances are provided in particulate form, e.g. shredded, ground or granulated. Scrap of films, fibers or fabrics can be provided in rolls, yarns or webs of certain width, allowing precise and uniform feeding into a mixing device. The compositions further comprise organic silanes and free radical-generating compounds. Optionally, such compositions comprise additional propylene-based polymers, cross-linking agents and additives. Finally, such compositions comprise propylene-based polymers, and ethylene-based polymers, whereas ethylene-based polymers are at least partially cross-linked by means of bonded organic silane. Optionally, bonded organic silane moieties of such compositions undergo silanol condensation, while the final composition remains thermoplastic. Such compositions exhibit low density, high melt strength, high heat resistance and good mechanical properties. Such compositions may be shaped by a variety of techniques suitable for thermoplastic polymers and allow multiple recycling.

Examples of propylene-based polymers are, but are not limited to, crystalline propylene homopolymers or random copolymers, containing 0.1-5% of ethylene, reactor blends of said homopolymers or random copolymers with rubbery predominantly amorphous ethylene—propylene copolymers (also known as heterophasic polypropylene copolymers).

The propylene-based polymers in the compositions of present invention may be present in proportion of 30% to 100% by weight from the total content of polymer components. Said ethylene-based polymers may be present in compositions of the invention in proportion of 0% to 70% by weight from the total content of polymer components. Ethylene-based polymers are partially or fully cross-linked. Excessive content of cross-linked ethylene-based polymers results in excessively high melt viscosity and poor processability of the final compositions. When a particulate mixed polyolefin waste, used for preparation of thermoplastic compositions of the present invention, contains more than 70% by weight of ethylene-based polymers, propylene-based polymers should be added to reduce ethylene-based polymers content of the composition to 70% by weight or lower. Such propylene-based polymers may be either virgin or recycled, or may constitute polypropylene-based scrap or waste, which, when added to said mixed polyolefin waste, reduces ethylene-based polymers content to below 70%, preferably, below 60%.

The term "cross-linked" for the purpose of the present invention means essentially insoluble in boiling xylene. Olefin polymer is considered fully cross-linked if its solubility in boiling xylene is below 5% by weight. If the solubility is above 5% but lower than 90% by weight, polymer is considered partially cross-linked. Presence of insufficiently cross-linked ethylene-based polymers in the thermoplastic compositions of the present invention may lead to coarsening of ethylene-based polymer dispersed phase, which, in turn, results in inferior mechanical properties.

The organic silanes of the present invention are oligomeric silanes preferably partially hydrolyzed, such as oligomeric alkoxy substituted vinyl, allyl or methacryl silanes, and blends thereof. The examples of such alkoxy substituted organic silanes are vinyl trimethoxy silane, vinyl triethoxy silane, vinyl triacetoxy silane, methacryl oxymethyl trimethoxy silane etc. Particularly preferred for the present invention are partially hydrolyzed oligomeric alkoxy vinyl silanes. Examples of such organic silanes are Dynasylan 6490, Dynasylan 6498 and Dynasylan 6598, commercially available from Evonik. Olygomeric alkoxy silanes, besides several alkoxy groups, contain two or more unsaturated carbon-carbon bonds per molecule. Such combination provides possibility of dual cross-linking mechanism, whereas a primary fast cross-linking by carbon—carbon double bonds is triggered by free radicals. Secondary cross-linking process, following silanol condensation mechanism, is usually slow. During melt mixing said free-radical induced primary cross-linking selectively cross-links ethylene-based polymers in the presence of propylene-based polymers and predetermines the final two-phase structure of the composition, wherein micron or submicron particles of cross-linked ethylene-based polymers are finely dispersed in the matrix phase of propylene-based polymers. The primary cross-linking may be followed by silanol condensation, increasing cross-link density of the already cross-linked dispersed phase. Since the final two-phase structure is already secured by the primary cross-linking, the secondary cross-linking may proceed slowly. In this case use of special cross-linking agents and/or silanol condensation accelerators is not necessary. However, cross-linking agents, accelerating silanol condensation, and providing fast secondary cross-linking optionally may be added. Besides dual cross-linking, advantages of oligomeric, partially hydrolyzed alkoxy silanes include their relatively high flash point (ensuring safe use of these silanes in the manufacturing process), and low amount of by-products (like methanol or ethanol) released during silanol condensation.

In the compositions of the invention organic silanes are present in amounts of from 0.01% to 5%, such as 0.1-5% or 0.2-4% or 0.3-3%, of the total amount of polymer components. Excessive amount of organic silanes may result in overly high cross-linking, resulting in poor processability. It may result also in presence of residual unreacted silane that is not desirable from the regulatory point of view. Insufficient amount of organic silanes results in poor mechanical properties.

Free radical-generating compounds useful in the context of the present invention include, but are not limited to, organic peroxides, organic nitroxides and organic compounds, containing labile carbon-carbon bonds, or combinations thereof. Examples of organic peroxides, suitable for the purpose of the present inventions are dialkyl proxides, diaryl peroxides, diacyl peroxides, alkyl-aryl peroxides, alkyl-acyl peroxides etc. A particularly useful peroxide is 2,5-dimethyl-2,5-di(tert-butylperoxy)hexane, commercially available from Arkema, Akzo and other producers. This peroxide is available in the liquid form or in form of concentrates in polyolefin porous substrate, and can be stored and used safely below 40° C. Examples of organic nitroxides include sterically hindered hydroxylamine esters, particularly, Irgatec CR76IC, commercially available from BASF as a masterbatch in polymer matrix. The example of organic compounds with labile carbon-carbon bond is 2,3-dimethyl-2,3-diphenylbutane. Amount of the free radical generating compounds in the initial compositions can vary from 0.0005% to 0.5% by weight. Since such compounds trigger simultaneously bonding of the organic silanes to polymer macromolecules, and chain scission of the propylene-based polymers, their amount and their ratio to the amount of organic silanes affect degree of the modification and final rheology of the compositions. Insufficient amount of the free radical generating compounds may result in ineffective modification, inferior mechanical properties of the compositions and excessive residual unreacted silane content. Too high amounts of the free radical generating compounds may result in excessive chain scission of the propylene-based polymers, poor processability and low melt strength. Moreover, it may result in the presence of residual unreacted free radical generator in the final compositions, making the final compositions unstable, hence strongly undesirable.

Cross-linking agents useful in the present invention are intended to accelerate silanol condensation. Such cross-linking agents include, but are not limited to, functional compounds with acidic functionality, capable to induce fast condensation of alkoxy-substituted silanes at temperatures above melting point of propylene polymers.

Particularly, cross-linking agents according to the present invention include inorganic acids, carboxylic acids, sulfonic acids and blends thereof. More specifically, preferable cross-linking agents include multifunctional acids, like adipic, maleic, phthalic and boric acids.

In one embodiment, silanol condensation of organic silanes, bonded to polymer macromolecules, is performed in the course of the manufacturing process. In this case silanol condensation should be completed during the residence time in the manufacturing equipment, otherwise ethylene-based polymers in the final composition remain insufficiently cross-linked. In another embodiment, when ethylene-based polymers are primarily cross-linked by means of carbon-carbon double bonds of oligomeric silanes, and the final structure of composition is fixed, silanol condensation may be performed slowly outside the manufacturing equipment. In this case cross-linking agent addition is not necessary.

Thermoplastic compositions according to the present invention may optionally comprise additives. Such additives include, but are not limited to, fillers, antioxidants, lubricants, colorants, plasticizers, extenders, acid scavengers, antistatic agents, light stabilizers.

Process of the Invention

The polymer compositions of the present invention can be manufactured via melt mixing of polymer components with organic silanes and free radical generating compounds.

The process of manufacturing of the thermoplastic compositions according to the present invention comprises providing propylene-based polymers, providing (optionally) ethylene-based polymers, providing organic oligomeric silanes and free radical-generating compounds, melting the polymer components, adding organic oligomeric silanes and free radical generating compounds to polymer components prior or after melting, and thorough melt mixing of the resulting mixture at specified temperature during the specified time in any device, appropriate for this purpose. The duration of the melt mixing depends on the mixing device, and may last from 1-2 minutes for continuous mixing device, like a twin-screw extruder, up to 10-15 minutes for a batch mixing device, like a Banbury mixer. Optionally, cross-linking agents and additives may be added during the melt mixing at specific moments and/or specific locations as specified hereinafter.

The cross-linking of ethylene-based polymers should be performed dynamically, in the presence of propylene-based polymers, during thorough melt mixing, when all the polymer components are molten. The melt mixing of the components should be sufficiently intensive to prevent static cross-linking of ethylene polymers and coarsening of the dispersed phase. If the intensity of mixing is insufficient, and/or the rate of cross-linking is excessively high, static cross-linking may occur and the desirable final phase structure of the compositions may not be achieved. In this case, the processability and properties of the final compositions will be inferior. The correct ratio of mixing and cross-linking intensity is achieved by proper choice of process conditions—temperatures and shear rates.

The melt mixing of the components may be performed continuously or batch wise. In the preferred embodiment of the invention, the melt mixing is performed continuously using a co-rotating twin-screw extruder. Such extruder, preferably having L/D ratio of at least 40, should be equipped with proper feeders for solids and liquids. Most preferably the continuous melt mixing is performed at temperatures allowing completing chemical reactions of bonding silanes to macromolecules and consequent selective cross-linking of ethylene-based polymers during the residence time inside the extruder. Such temperatures depend on the polymer components selection and proportions and the type of free radical generating compound. Preferably, such temperatures are chosen in the range between 200 and 290° C. The rotation speed of the screws is chosen high enough to provide dynamic cross-linking conditions and desirable final structure of the compositions.

When the cross-linking of the ethylene-based polymers or modification of the propylene-based polymers includes silanol condensation, a cross-linking agent has to be added to the mixture of molten components during intensive mixing. Such cross-linking agent of the type described above is added after mixing of polymer components with organic silanes and free radical generating compounds, preferably, after bonding of organic silanes to macromolecules. When the process is carried out in the twin-screw extruder, such cross-linking agent may be added via additional feeder or via side feeder.

In another embodiment, when the process is performed batch wise, e.g. in a Banbury mixer, polymer components, organic silanes and free radical generating compounds are loaded at the beginning of the process, whereas cross-linking agents, if needed, are loaded later. Additives may be loaded together with polymer components, or later in the process.

In still another embodiment the process of the present invention comprises providing a mixed polyolefin waste, providing (optionally) propylene-based polymers and ethylene-based polymers, providing organic silanes and free radical generating compounds, melting the polymer components, adding organic silanes and free radical generating compounds to polymer components prior or after melting, and thorough melt mixing of the resulting mixture at specified temperature during the specified time in any device, appropriate for this purpose. Optionally, cross-linking agents and additives may be added during mixing at specific moments and/or specific locations as specified here above.

Mixed polyolefin plastic waste may be taken from any source—industrial scrap or post-consumer, as described earlier. Such waste should preferably be provided in particulate form. Preferably, it should be shredded, ground, granulated, pelletized or otherwise divided into particles of relatively uniform size to be properly fed by the loading devices of the equipment, used for manufacturing. Scrap of films, fibers or nonwoven fabrics can be provided in rolls, yarns or webs of certain width, allowing precise and uniform feeding into a mixing device. If such waste contains ethylene-based polymers in the amount exceeding 70% by weight, propylene-based polymers should be added to the process in order to reduce ethylene-based polymers content to 70% by weight or below.

After completing the reactions inside the equipment, the final compositions are unloaded and cooled, preferably in particulate form, most preferably, pelleltized. Such compositions may be further used for production of plastic parts, profiles and other articles by any shaping technique known in the art for shaping thermoplastic polymer compositions. High melt strength of the thermoplastic composition of the present invention is advantageous for majority of these techniques.

Melt strength is a direct measure of shape stability of molten polymers and plays central role in certain polymer processing techniques. Melt strength, expressed as a stress, required for deforming the polymer melt, is measured by extensional rheology. Alternatively, melt strength may be estimated by the melt elasticity, analyzed by shear melt rheology, e.g. oscillation rheometry techniques, capable of measuring storage modulus, loss modulus and complex viscosity of melt as a function of shear oscillation rate. Melt strength is a very important parameter for processing techniques including melt stretching, like blow molding, thermoforming, blown films, foaming etc. Insufficient melt strength results in inferior shape and dimensional stability of blow molded or thermoformed parts, non-uniform thickness, significant limitations in deep drawing or foaming ability.

Shaped Products of the Invention

Final shaped products of the invention, made from the thermoplastic compositions, modified by organic silanes, include, but are not limited to filaments, fibers, pellets, sheets, molded and thermoformed articles, films, pipes, tubes, hollow articles etc. Such products may be manufactured using any shaping technique, suitable for processing of polyolefin thermoplastics, known in the art. Examples of such techniques include, but are not limited to extrusion, compression molding, injection molding, thermoforming, blow molding, fiber spinning, 3D-printing. Such final shaped products exhibit high heat resistance and good mechanical properties, may be recycled and reprocessed multiple times.

The present invention thus provides thermoplastic polyolefin based compositions, optionally comprising recycled polyolefin components, having the desired properties, and a process for manufacturing them. In the compositions, optionally comprising ethylene-based polymers, non-polyolefin polymers and non-polymer additives, part of the macromolecules is branched or cross-linked by means of partially hydrolyzed oligomeric alkoxy substituted vinyl, allyl or methacryl silanes, or blends thereof.

EXAMPLES

The following examples illustrate the compositions of the invention, their advantageous properties and the process of their manufacture.

Components

The Following Components were Used:

PP1 is a propylene homopolymer (reactor powder, MFR 2), produced at Carmel Olefins.

PP2 is a propylene homopolymer (reactor powder, MFR 25), produced at Carmel Olefins.

PP3 is a heterophasic copolymer of propylene with ethylene (reactor powder, MFR 1.3, ethylene content 9.5%), produced at Carmel Olefins.

PP4 is a heterophasic copolymer of propylene with ethylene (reactor powder, MFR 20, ethylene content 11.5%), produced at Carmel Olefins.

PP5 is a hetero-phasic copolymer of propylene with ethylene (reactor powder, MFR 5, ethylene content 16%), produced at Carmel Olefins.

LLDPE1 is a linear low density polyethylene Lotrene Q1018N (C4 LLDPE, MFR 1, density 918 kg/m$^3$), commercially available from Total Petrochemicals.

LLDPE2 is a metallocene linear low density polyethylene Evolue SP1071C (C6 LLDPE, MFR 10, density 910 kg/m$^3$), commercially available from Mitsui Chemicals.

MDPE1 is a medium density polyethylene Marlex HHM TR-131 (C6 MDPE, MFR 0.3, density 937 kg/m$^3$), commercially available from Chevron Phillips Chemical.

RecPP1 is a post-consumer recycled black polypropylene homo-polymer (MFR 6, pelletized), commercially available from various suppliers.

RecPE1 is a post-consumer recycled mixed polyethylene (containing predominantly LDPE and LLDPE, MFR 1, black, pelletized), commercially available from Amnir Ltd. (Israel).

Dynasylane 6490 is a partially hydrolyzed vinyl trimethoxy silane, commercially available from Evonik.

Trigonox 101PP20 is a 20% solid concentrate of Trigonox 101 (2,5-dimethyl-2,5-di(tert-butylperoxy)hexane)—a free radical generator, commercially available from Akzo Nobel in a porous polypropylene support.

Irganox B225 is a binary blend of antioxidants (hindered phenol+phosphite=1:1), commercially available from BASF.

Boric Acid and Calcium Stearate are commercially available from various sources.

Equipment

All compositions in the following examples were produced using a Berstorff ZE25 co-rotating twin-screw extruder (screws diameter 25 mm, L/D ratio 40:1), equipped with 4 gravimetric feeders, side feeder, two-hole die, cooling bath and strand pelletizer.

Specimens for mechanical tests were prepared using a JSW injection molding machine, equipped with a standard ISO mold. Specimens with weld line (WL) were prepared using the same injection molding machine and a special mold with two gates.

Procedure of compositions preparation Polymer components, including propylene-based polymers and ethylene-based polymers, were fed into the co-rotating twin-screw extruder via main port, using gravimetric feeders. Virgin propylene-based polymers were fed in the form of reactor powder, while ethylene-based polymers and recycled polymers were fed in the form of granules. In some cases the polymers were fed as a dry blend, otherwise they were fed separately via separate feeders. Organic silane (liquid) and free radicals generator (solid), as well as the additives, except cross-linking agent, were first pre-mixed with the propylene-based polymer, and then fed together with it. Cross-linking agent (boric acid), when needed, was first pre-mixed with part of the propylene-based polymer and then fed together with it via side-feeder. Processing of the compositions in the twin-screw extruder was performed at the following conditions:

Barrel temperatures (set-up): 50-180-230-150-180-220-220-220° C., die temperature-200-220° C., screws speed—200-300 rpm, throughput—5-10 kg/h.

Strands, leaving the die after cooling in the water bath were cut in the strand pelletizer into pellets. Specimens for mechanical tests were prepared from these pellets by injection molding.

Measurements

All the specimens for mechanical tests were conditioned before testing at 23° C. and 50% relative humidity for 48 h.

Tensile strength and elongation at yield and at break were measured using an Instron tensile testing machine at 50 mm/min, according to ISO 527-2.

Flexural modulus was measured using a Zwick testing machine at 1 mm/min, according to ISO 178.

Izod notched and unnotched impact resistance at 23° C. and −20° C. was measured using Ceast Resil 5.5 instrument, according to ISO 180.

Melt flow rate (MFR) was measured in grams per 10 min. at 2.16 kg and 230° C., using Davenport instrument, according to ISO 1133.

Rheological properties of the compositions were evaluated by oscillational rheometry in frequency sweep mode experiments using ARES G2 rotational rheometer (TA Instruments). The tests were performed at 200° C., using 25-mm parallel plates geometry at 2 mm gap in the frequencies range from 0.05 to 100 Hz. Plots of storage modulus, loss modulus, and complex viscosity v. frequency were recorded.

Spinnability of the compositions at increasing take-off speed was evaluated using a Goettfert RH25 capillary rheometer, equipped with 1 mm in diameter, 30 mm-long capillary and haul-off device, at constant piston travel speed 0.03 mm/s, starting spinning speed 30 mm/s and acceleration 6 mm/s$^2$. Load applied to the melt spun monofilament and corresponding spinning speed were recorded in the experiments. Ultimate spinning speed sustained by monofilament served as a measure of the composition spinnability.

Example 1

Propylene-Based Polymer Compositions, Modified by Organic Silanes.

Compositions, their preparation process and properties are summarized in Table 1.

TABLE 1

Propylene-based polymer compositions, modified by organic silanes.

| Components | E1 | E2 | E3 | E4 | E5 | E6 | E7 | E8 | E9 |
|---|---|---|---|---|---|---|---|---|---|
| Main feeder-% | | | | | | | | | |
| PP3 | 84.2 | 83.8 | 83.8 | | | | | | |
| PP4 | | | | 84.2 | 83.8 | 83.8 | | | |
| PP5 | | | | | | | 84.2 | 83.8 | 83.8 |
| Dynasylane 6490 | 0.4 | 0.8 | 0.8 | 0.4 | 0.8 | 0.8 | 0.4 | 0.8 | 0.8 |
| Trigonox 101PP20 | 0.4 | 0.4 | 0.4 | 0.4 | 0.4 | 0.4 | 0.4 | 0.4 | 0.4 |
| Side feeder-% | | | | | | | | | |
| PP1 | 14.7 | 14.7 | 14.3 | 14.7 | 14.7 | 14.3 | 14.7 | 14.7 | 14.3 |
| Boric acid | 0.0 | 0.0 | 0.4 | 0.0 | 0.0 | 0.4 | 0.0 | 0.0 | 0.4 |
| Irganox B225 | 0.3 | 0.3 | 0.3 | 0.3 | 0.3 | 0.3 | 0.3 | 0.3 | 0.3 |
| Properties | | | | | | | | | |
| MFR, g/10 min (230-2.16) | 17.4 | 15.7 | 5.9 | 56.5 | 56.7 | 28.9 | 23.8 | 23.5 | 7.2 |
| Flexural modulus, MPa | 926.0 | 945.0 | 1130.0 | 940.0 | 912.0 | 1086.0 | 794.0 | 785.0 | 900.0 |
| Tensile strength, MPa | 22.0 | 22.6 | 25.6 | 22.3 | 22.0 | 23.9 | 18.4 | 18.9 | 20.3 |
| Elongation at yield, % | 8.9 | 9.5 | 10.6 | 8.6 | 10.3 | 9.3 | 8.1 | 8.5 | 10.5 |
| Elongation at break, % | 654.6 | 619.0 | 703.0 | 73.0 | 252.0 | 107.0 | 288.0 | 515.0 | 560.0 |
| Izod notched, 23° C., kJ/m2 | 17.1 | 34.0 | 35.3 | 10.2 | 10.3 | 11.3 | 43.6 | 42.8 | 40.8 |
| Izod notched, −20° C., kJ/m2 | 7.0 | 6.9 | 7.4 | 5.2 | 4.8 | 6.5 | 11.6 | 10.9 | 11.3 |

Comparative examples of the same compositions with the same components, but without organic silane are summarized in Table 2.

TABLE 2

Comparative examples-propylene-based polymer compositions without organic silane

| Components | C1 | C2 | C3 | C4 | C5 | C6 |
|---|---|---|---|---|---|---|
| Main feeder-% | | | | | | |
| PP3 | 84.6 | 84.6 | | | | |
| PP4 | | | 84.6 | 84.6 | | |
| PP5 | | | | | 84.6 | 84.6 |
| Trigonox 101PP20 | 0.4 | 0.4 | 0.4 | 0.4 | 0.4 | 0.4 |
| Side feeder-% | | | | | | |
| PP1 | 14.7 | 14.3 | 14.7 | 14.3 | 14.7 | 14.3 |
| Boric acid | 0.0 | 0.4 | 0.0 | 0.4 | 0.0 | 0.4 |
| Irganox B225 | 0.3 | 0.3 | 0.3 | 0.3 | 0.3 | 0.3 |
| Properties | | | | | | |
| MFR, g/10 min (230-2.16) | 18.6 | 20.3 | 65.6 | 68.2 | 32.5 | 31.9 |
| Flexural modulus, MPa | 930.0 | 950.0 | 912.0 | 960.0 | 770.0 | 750.0 |
| Tensile strength, MPa | 22.1 | 22.3 | 21.1 | 21.3 | 16.3 | 16.5 |
| Elongation at yield, % | 10.2 | 10.5 | 10.3 | 9.8 | 8.5 | 8.8 |
| Elongation at break, % | 83.0 | 67.0 | 32.0 | 38.0 | 46.0 | 54.0 |
| Izod notched impact, 23° C., kJ/m2 | 5.2 | 4.9 | 8.6 | 7.9 | 15.2 | 14.6 |
| Izod notched impact, −20° C., kJ/m2 | 3.8 | 3.6 | 4.8 | 4.5 | 6.9 | 7.1 |

Comparing properties of counterpart compositions from Tables 1 and 2 it can be seen that the presence of organic silane in the compositions of propylene-based polymers greatly increases impact resistance, both at ambient and sub-zero temperatures, while leading to somewhat lower fluidity (MFR).

Example 2

Polypropylene and Polyethylene-Based Compositions, Modified by Organic Silanes.

Compositions, their preparation process and properties are summarized in Table 3.

TABLE 3

Polypropylene and polyethylene-based compositions, modified by silanes.

| Components | E10 | E11 | E12 | E13 | E14 | E15 | E16 | E17 |
|---|---|---|---|---|---|---|---|---|
| Main feeder-% | | | | | | | | |
| PP2 | 79.20 | 69.20 | 59.20 | 64.20 | 54.20 | 44.20 | 49.20 | 34.20 |
| LLDPE1 | 20.00 | 30.00 | 40.00 | 20.00 | 30.00 | 40.00 | 50.00 | 50.00 |
| Irganox B225 | 0.10 | 0.10 | 0.10 | 0.10 | 0.10 | 0.10 | 0.10 | 0.10 |
| Ca Stearate | 0.05 | 0.05 | 0.05 | 0.05 | 0.05 | 0.05 | 0.05 | 0.05 |
| Dynasylane 6490 | 0.40 | 0.40 | 0.40 | 0.40 | 0.40 | 0.40 | 0.40 | 0.40 |
| Trigonox 101PP20 | 0.25 | 0.25 | 0.25 | 0.25 | 0.25 | 0.25 | 0.25 | 0.25 |

TABLE 3-continued

Polypropylene and polyethylene-based compositions, modified by silanes.

| Components | E10 | E11 | E12 | E13 | E14 | E15 | E16 | E17 |
|---|---|---|---|---|---|---|---|---|
| | | | | Side feeder-% | | | | |
| PP2 | 0.00 | 0.00 | 0.00 | 14.60 | 14.60 | 14.60 | 0.00 | 14.60 |
| Boric acid | 0.00 | 0.00 | 0.00 | 0.40 | 0.40 | 0.40 | 0.00 | 0.40 |
| | | | | Properties | | | | |
| MFR, g/10 min (230-2.16) | 32.0 | 18.0 | 8.0 | 25.5 | 9.0 | 1.1 | 3.5 | 0.2 |
| Flexural modulus, MPa | 1165 | 1164 | 868 | 1287 | 1108 | 933 | 650 | 676 |
| Izod notched, 23° C., kJ/m2 | 3.3 | 4.6 | 4.8 | 3.7 | 5.3 | 7.4 | 36.0 | 47.6 |
| Izod notched, −20° C., kJ/m2 | 2.3 | 2.7 | 3.3 | 2.2 | 3.2 | 3.4 | 4.2 | 5.6 |
| Tensile strength, MPa | 27.3 | 27.2 | 21.4 | 28.3 | 25.2 | 22.1 | 18.0 | 18.1 |
| Elongation at yield, % | 8.1 | 8.4 | 10.2 | 9.0 | 9.1 | 10.5 | 18.5 | 17.5 |
| Elongation at break, % | 83.3 | 65.3 | 257.0 | 51.4 | 144.0 | 366 | 530.0 | 510.0 |
| Tensile strength WL, MPa | 26.8 | 23.9 | 21.1 | 28.2 | 24.5 | 21.2 | 18.0 | 17.9 |
| Elongation at break WL, % | 38.5 | 37.6 | 38.9 | 14.7 | 33.1 | 64 | 42.5 | 52.3 |

Figure 2:
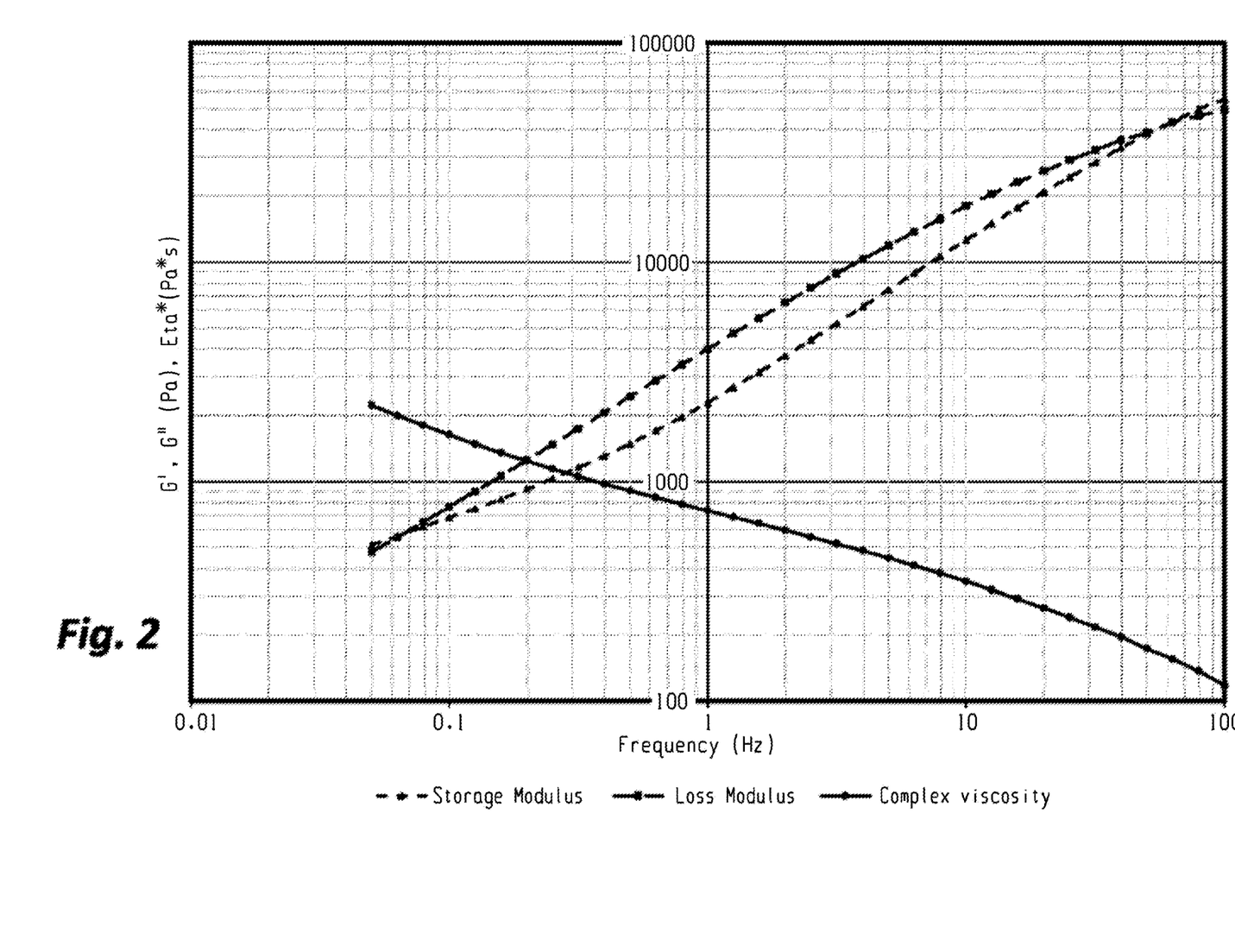
FIG. 2 presents the same plots for composition E10 from Table 3 (20% of ethylene-based polymer—LLDPE1, 0.4% of organic silane, without silanol cross-lining agent). The moduli plots demonstrate a very specific behavior, manifesting two cross-over points. Storage modulus is higher than loss modulus at low and high frequencies, while within the range of intermediate frequencies 0.1÷70 Hz loss modulus is higher. Complex viscosity falls from 10,000 to about 200 Pa*s over three decades of frequency. As in the previous case of composition E35, such behavior implies advantageous combination of high melt elasticity with good flow ability at processing conditions.
Figure 3:
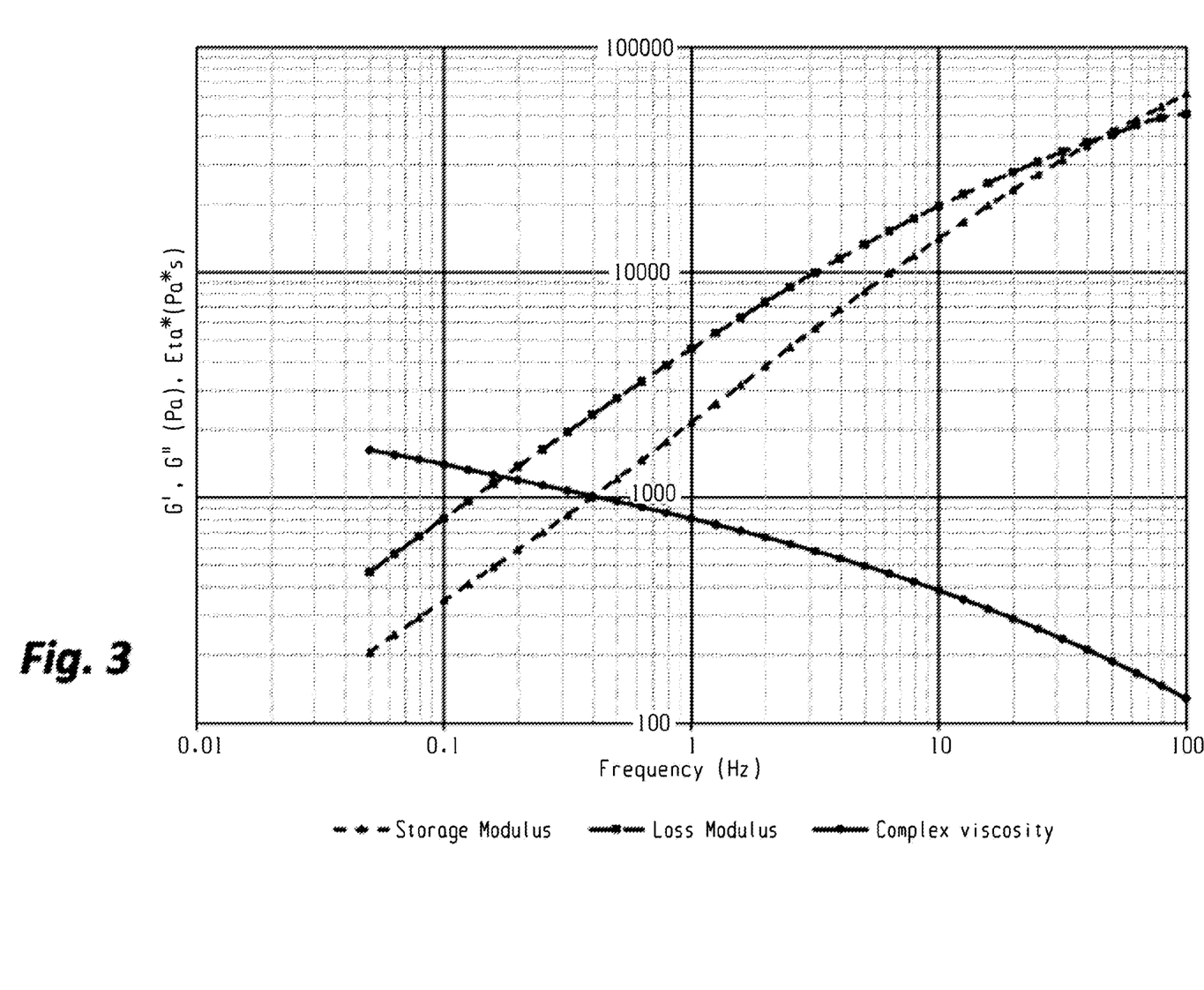
FIG. 3 demonstrates the rheological behavior of a comparative composition C1 from Table 2 (propylene-based polymer with free radicals generator, but without organic silane). The behavior is quite similar to that of regular polypropylene melt—G" is higher than G' over almost entire interval of the frequencies with the crossover point at ~40 Hz. The plot of complex viscosity manifests shear thinning, while decreasing from 1000 to 120 Pa*s over three decades of frequency. Such behavior indicates good flow ability, but low melt strength.

The data in Table 3 clearly demonstrate the attractive mechanical properties of the experimental compositions, especially impact resistance. Increased content of ethylene-based polymer leads to a sharp increase in impact resistance at the expense of stiffness and melt flow rate. However, all the compositions were easily processable by injection molding and showed high melt elasticity, evidencing improved melt strength (see FIG. 2 in comparison to FIG. 3). All the compositions, regardless of high ethylene-based polymer content, demonstrated high tensile strength and elongation at weld line, actually most of the compositions broke outside the weld line.

Comparative compositions, comprising propylene-based polymer and ethylene-based polymer, but without organic silane, are presented in Table 4. Poor impact resistance and tensile properties at weld line make such compositions unusable in a wide variety of applications, like injection molded, blow molded parts, film applications etc.

TABLE 4

Comparative polypropylene - polyethylene compositions without silane.

| Components | C7 | C8 | C9 | C10 |
|---|---|---|---|---|
| | | Main feeder, % | | |
| PP2 | 80.00 | 70.00 | 60.00 | 50.00 |
| LLDPE1 | 20.00 | 30.00 | 40.00 | 50.00 |

TABLE 4-continued

Comparative polypropylene - polyethylene compositions without silane.

| Components | C7 | C8 | C9 | C10 |
|---|---|---|---|---|
| | | Properties | | |
| MFR, g/10 min (230-2.16) | 13.2 | 14.0 | 11.6 | 9.4 |
| Flexural modulus, Mpa | 1463 | 1260 | 1129 | 989 |
| Izod notched, 23° C., kJ/m2 | 3.3 | 3.8 | 5.6 | 7.5 |
| Izod notched, −20° C., kJ/m2 | 2.04 | 2.2 | 2.6 | 3.23 |
| Tensile strength, Mpa | 30.1 | 27.1 | 24.9 | 22.3 |
| Elongation at yield, % | 7.2 | 6.8 | 7.4 | 7.5 |
| Elongation at break, % | 256.7 | 170.5 | 243.5 | 284.0 |
| Tensile strength WL, Mpa | 21.4 | 19.7 | 19.0 | 18.1 |
| Elongation at break WL, % | 0.8 | 0.9 | 1.3 | 1.3 |

Example 3

Effect of Silane Concentration on Compositions Made of Propylene-Based Polymers.

This example includes several compositions of propylene-based polymers, modified by organic silanes, and two comparative compositions without silanes (C12 with a free radicals generator and C11 without). The compositions, their components, processing and properties are summarized in Table 5. It can be easily seen from Table 5 that addition of organic silane in combination with free radical generator significantly improves mechanical properties of compositions, namely impact resistance at ambient and subzero temperatures, without decrease in flexural modulus and tensile strength.

TABLE 5

Polypropylene-based compositions with different concentration of organic silane

| Components | C11 | C12 | E18 | E19 | E20 | E21 |
|---|---|---|---|---|---|---|
| | | | Main feeder-% | | | |
| PP4 | 84.95 | 84.70 | 84.68 | 84.65 | 84.60 | 84.50 |
| Calcium stearate | 0.05 | 0.05 | 0.05 | 0.05 | 0.05 | 0.05 |

TABLE 5-continued

Polypropylene-based compositions with different concentration of organic silane

| Components | C11 | C12 | E18 | E19 | E20 | E21 |
|---|---|---|---|---|---|---|
| Dynasylane 6490 | 0 | 0 | 0.02 | 0.05 | 0.1 | 0.2 |
| Trigonox 101PP20 | 0 | 0.25 | 0.25 | 0.25 | 0.25 | 0.25 |
| Side feeder-% | | | | | | |
| PP4 | 14.9 | 14.9 | 14.80 | 14.80 | 14.80 | 14.80 |
| Boric acid | 0 | 0 | 0.1 | 0.1 | 0.1 | 0.1 |
| Irganox B225 | 0.1 | 0.1 | 0.1 | 0.1 | 0.1 | 0.1 |
| MFR, g/10 min (230-2.16) | 21.2 | 72.3 | 66.9 | 57.0 | 49.2 | 45.3 |
| Flexural modulus, Mpa | 1027 | 922 | 952 | 926 | 951 | 1024 |
| Izod notched, 23° C., kJ/m2 | 8.4 | 5.4 | 8.0 | 9.5 | 11.2 | 13.8 |
| Izod notched, −20° C., kJ/m2 | 4.3 | 3.5 | 5.5 | 6.0 | 6.7 | 6.6 |
| Tensile strength, Mpa | 20.8 | 19.1 | 20.0 | 20.2 | 20.6 | 21.7 |
| Elongation at yield, % | 6.1 | 5.3 | 4.4 | 4.5 | 4.8 | 4.6 |
| Elongation at break, % | 476.0 | 21.4 | 14.4 | 11.5 | 20.7 | 13.3 |

Example 4

Effect of Silane Concentration on Compositions Made of Propylene-Based and Ethylene-Based Polymers.

Table 6 summarizes the effect of silane concentration on the properties of mixed propylene-based and ethylene-based polymer compositions at three different proportions between the polymers. It can be seen from Table 6 that at all the proportions increase in silane concentration improves properties, namely, impact resistance. Ultimate spinning speed was unexpectedly high and surprisingly increasing with ethylene-based polymer and silane content, indicating good processability via melt spinning. Also improvement of weld line strength and elongation with increase in ethylene-based polymer and silane content was observed unexpectedly and surprisingly.

TABLE 6

Summary of the effect of silane concentration on mixed propylene-based and ethylene-based polymer compositions

| Components | E22 | E23 | E24 | E25 | E26 | E27 | E28 | E29 | E30 |
|---|---|---|---|---|---|---|---|---|---|
| Main feeder, % | | | | | | | | | |
| PP2 | 79.50 | 79.40 | 79.20 | 69.50 | 69.40 | 69.20 | 59.50 | 59.40 | 59.20 |
| LLDPE1 | 20.00 | 20.00 | 20.00 | 30.00 | 30.00 | 30.00 | 40.00 | 40.00 | 40.00 |
| Irganox B225 | 0.10 | 0.10 | 0.10 | 0.10 | 0.10 | 0.10 | 0.10 | 0.10 | 0.10 |
| Calcium Stearate | 0.05 | 0.05 | 0.05 | 0.05 | 0.05 | 0.05 | 0.05 | 0.05 | 0.05 |
| Dynasylan 6490 | 0.10 | 0.20 | 0.40 | 0.10 | 0.20 | 0.40 | 0.10 | 0.20 | 0.40 |
| Trigonox 101PP20 | 0.25 | 0.25 | 0.25 | 0.25 | 0.25 | 0.25 | 0.25 | 0.25 | 0.25 |
| Properties | | | | | | | | | |
| MFR, g/10 min (230-2.16) | 41.4 | 35.6 | 31.9 | 22.0 | 20.2 | 13.3 | 14.1 | 9.4 | 4.0 |
| Flexural modulus, Mpa | 1292 | 1229 | 1224 | 1068 | 1056 | 1023 | 944 | 933 | 860 |
| Izod notched, 23° C., kJ/m2 | 3.3 | 2.9 | 3.1 | 3.0 | 3.5 | 4.2 | 3.4 | 4.1 | 4.9 |
| Izod notched, −20° C., kJ/m2 | 2.2 | 2.3 | 2.2 | 3.2 | 3 | 3 | 3.4 | 3.4 | 3.2 |
| Tensile strength, Mpa | 27.7 | 27.2 | 27.3 | 24.2 | 24.0 | 23.5 | 21.8 | 21.9 | 21.2 |
| Elongation at yield, % | 7.6 | 7.6 | 7.7 | 8.4 | 8.9 | 9.2 | 9.8 | 9.9 | 10.7 |
| Elongation at break, % | 25.9 | 28.5 | 31.3 | 29.6 | 43.0 | 38.2 | 39.7 | 48.4 | 90.5 |
| Tensile strength WL, Mpa | 27.9 | 27.0 | 26.8 | 23.7 | 23.6 | 24.0 | 21.3 | 21.3 | 20.5 |
| Elongation at break WL, % | 8.0 | 12.4 | 11.9 | 12.2 | 18.6 | 22.8 | 22.3 | 21.6 | 34.8 |
| Ultimate spinning speed, mm/s | Breaks | 2,300 | 2,600 | 3,000 | 3,200 | 4,000 | 4,200 | 4,000 | 5,500 |

Example 5

Effect of the Ethylene-Based Polymer Type on Mixed Propylene-Based and Ethylene-Based Polymer Compositions.

Table 7 summarizes the effect of ethylene-based polymer presence and type on properties of mixed compositions. Table 7 includes eight mixed compositions: three compositions of the invention, differing in types of ethylene-based polymer, with silanol cross-linking agent; three their counterparts without the cross-linking agent; and two compositions without ethylene-based polymer. Of the last two, one is a composition of invention (E34), whereas the second composition (C13) is comparative, i.e. does not comprise an organic silane.

Figure 1:
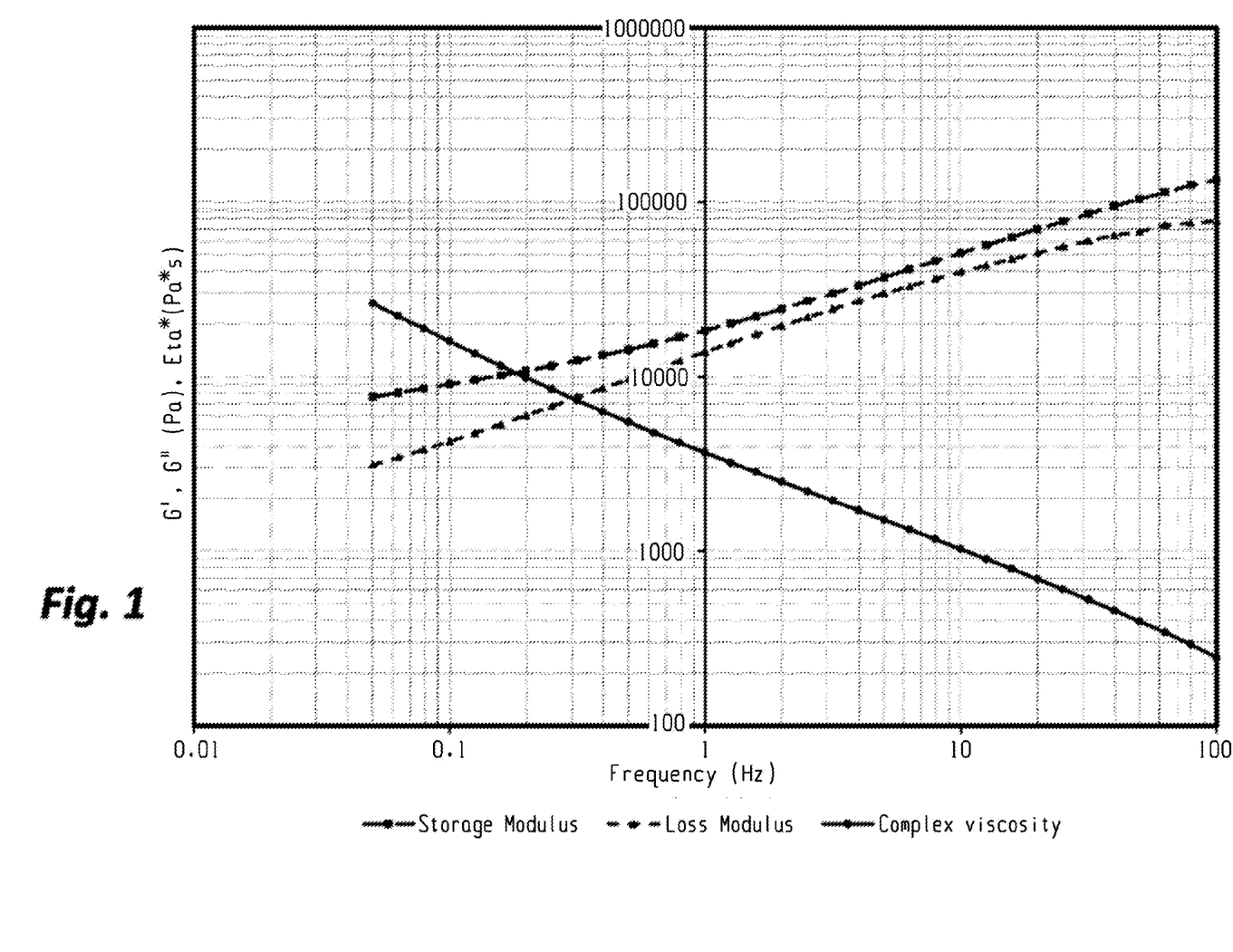
FIG. 1 shows results of the rheological characterization of molten composition E35 from Table 6 (50% of ethylene-based polymer—LLDPE1, 1.2% of organic silane, boric acid as a silanol cross-linking agent) using oscillational rheometry. Presented are plots of storage modulus (G'), loss modulus (G") and complex viscosity (Eta*) v. frequency. The rheology of the composition is characterized by G' being higher than G" over the entire range of frequencies, and Eta* demonstrating steep decrease from very high values at low shear rates to rather low values at high shear rates (shear rate is equal to frequency multiplied by 6.28). Such rheological behavior implies advantageous combination of high melt elasticity and good processability.

It can be clearly seen that the presence of ethylene-based polymer in the compositions modified by organic silane, greatly improves impact resistance, especially at subzero temperatures, at the expense of stiffness. MDPE containing compositions exhibit lower impact resistance at subzero temperatures than those containing LLDPE, however, the stiffness reduction is also much lower. All ethylene-based polymer containing compositions, modified by organic silane, exhibit remarkably high elongation at break, evidencing good compatibility of polyethylene and polypropylene phases in these compositions, although polyethylene phase constitutes 50% of total polymer content. Composition, comprising merely propylene-based polymer, modified by organic silane, exhibits somewhat higher impact resistance at ambient temperature, than the comparative one. On the other hand, all silane modified compositions exhibit lower melt flow rate and higher melt strength, stemming from their very specific rheological behavior, namely high melt elasticity, as shown in FIG. 1 (compared to FIG. 3). Very high melt viscosity at low shear rate, and sharp decrease in viscosity with increase in shear rate explain the finding that all silane modified compositions can be easily melt processed, e.g. injection molded, despite very low MFR (measured at low shear rate).

TABLE 7

Effect of ethylene-based polymer type on the compositions

| | C13 | E31 | E32 | E33 | E34 | E35 | E36 | E37 |
|---|---|---|---|---|---|---|---|---|
| Main feeder-% | | | | | | | | |
| PP1 | 84.60 | 33.40 | 33.40 | 33.40 | 83.40 | 33.40 | 33.40 | 33.40 |
| LLDPE1 | | 50.00 | | | | 50.00 | | |
| LLDPE2 | | | 50.00 | | | | 50.00 | |
| MDPE1 | | | | 50.00 | | | | 50.00 |
| Dynasylane 6490 | 0.00 | 1.20 | 1.20 | 1.20 | 1.20 | 1.20 | 1.20 | 1.20 |
| Trigonox 101PP20 | 0.40 | 0.40 | 0.40 | 0.40 | 0.40 | 0.40 | 0.40 | 0.40 |
| Side feeder-% | | | | | | | | |
| PP1 | 300.00 | 300.00 | 300.00 | 300.00 | 300.00 | 300.00 | 300.0.0 | 300.00 |
| Boric acid | 0.00 | 0.00 | 0.00 | 0.00 | 8.00 | 8.00 | 8.00 | 8.00 |
| Irganox B225 | 5.00 | 5.00 | 5.00 | 5.00 | 5.00 | 5.00 | 5.00 | 5.00 |
| Properties | | | | | | | | |
| MFR, g/10 min (230-2.16) | 24.5 | 0.5 | 0.0 | 0.1 | 6.2 | 0.0 | 0.0 | 0.0 |
| Flexural modulus, Mpa | 1317 | 570 | 683 | 968 | 1608 | 649 | 734 | 1025 |
| Izod notched, 23° C., kJ/m2 | 3.6 | 65.4 | 68.0 | 48.6 | 4.1 | 67.5 | 64.5 | 59.7 |
| Izod notched, −20° C., kJ/m2 | 1.5 | 6.94 | 30.51 | 3.84 | 1.6 | 7.95 | 33.75 | 4.92 |
| Tensile strength, Mpa | 32.0 | 25.5 | 26.6 | 23.2 | 33.8 | 28.0 | 27.2 | 24.0 |
| Elongation at yield, % | 11.0 | 20.4 | 19.7 | 14.3 | 10.8 | 20.0 | 19.2 | 16.6 |
| Elongation at break, % | 745.0 | 560.0 | 539.0 | 481.0 | 409.0 | 516.0 | 491.0 | 441.0 |

Example 6

Recycled Mixed Polymer Compositions, Modified by Organic Silanes.

Table 8 summarizes preparations and properties of mixed polymer compositions based on recycled polymers, modified by organic silane. In this specific example post-consumer propylene-based and ethylene-based separately recycled polymers were used. However, it is understood that the invention is not limited to this specific case. Other combinations may be applied as well, such as blends of virgin and recycled polymers, mixed recycled post-consumer waste, or mixed particulate waste or scrap prior to recycling, with or without addition of prime polymers. It infers from Table 8 that modification of mixed polyolefin waste by organic oligomeric silane in presence of free radicals generator, either with or without addition of virgin polymers, results in compositions with attractive mechanical properties. Such compositions can be processed by injection molding, extrusion or other techniques, and shaped into useful durable products.

TABLE 8

Mixed composition of recycled polymers, modified by organic silanes

| Components, % | E38 | E39 | E40 | E41 |
|---|---|---|---|---|
| PP2 | 69.20 | 59.20 | | |
| RecPP1 | | | 69.20 | 59.20 |
| RecPE1 | 30.00 | 40.00 | 30.00 | 40.00 |
| Irganox B225 | 0.10 | 0.10 | 0.10 | 0.10 |
| Ca Stearate | 0.05 | 0.05 | 0.05 | 0.05 |
| Dynasylane 6490 | 0.40 | 0.40 | 0.40 | 0.40 |
| Trigonox 101PP20 | 0.25 | 0.25 | 0.25 | 0.25 |
| Properties | | | | |
| MFR, g/10 min (230-2.16) | 21.3 | 10.5 | 3.2 | 1.2 |
| Flexural modulus, Mpa | 1051 | 907 | 807 | 696 |
| Izod notched, 23° C., kJ/m2 | 3.0 | 3.3 | 3.8 | 5.0 |
| Izod notched, −20° C., kJ/m2 | 2.2 | 2.5 | 3.2 | 3.5 |
| Izod unnotched, 23° C., kJ/m2 | 45.2 | 68.1 | 106.1 | 97.4 |
| Breaking mode (unnotched) | Complete break | Hinged | No break | No break |
| Tensile strength, Mpa | 24.7 | 22.1 | 20.2 | 18.2 |
| Elongation at yield, % | 8.3 | 9.3 | 11.0 | 13.1 |
| Elongation at break, % | 11.3 | 21.9 | 17.1 | 22.2 |

The examples, presented herein, evidence that compositions of propylene-based polymers, optionally comprising ethylene-based polymers, modified by oligomeric organic silanes in presence of free radicals generating compounds, demonstrate clear benefits over unmodified compositions in mechanical performance (impact resistance), weld line strength, melt strength, processability and recyclability. Such compositions, comprising virgin or recycled polymers, and/or mixed polyolefin waste or scrap, remain thermoplastic, albeit they may be at least partially cross-linked. They can be converted into useful and durable goods by eventually all existing methods for thermoplastics processing, and can surpass multiple recycling.

While the invention has been described using some specific examples, many modifications and variations are possible. It is therefore understood that the invention is not intended to be limited in any way, other than by the scope of the appended claims.

The invention claimed is:

1. A thermoplastic polyolefin composition comprising:
   propylene-based polymers;
   0.01-5 wt % of organic oligomeric silanes selected from partially hydrolyzed alkoxy substituted vinyl or allyl silanes, and blends thereof, and
   0.0005-0.5 wt % of a compound capable of generating free radicals; wherein
   said composition is capable of being shaped and repeatedly recycled.

2. The thermoplastic composition of claim 1, wherein said organic silane is present in an amount of between 0.1 and 3.0 wt %.

3. The thermoplastic composition of claim 1, comprising 30-99 wt % of propylene-based polymers and 1-70 wt % of ethylene-based polymers, said ethylene-based polymers being at least partially cross-linked by means of said organic silanes.

4. The thermoplastic composition of claim 3, comprising mixed polyolefin waste, said waste comprising propylene-based polymers and ethylene-based polymers, wherein the ethylene-based polymers are at least partially cross-linked by means of said organic silanes.

5. The composition of claim 1, comprising a propylene-based polymer selected from polypropylene homopolymers, partially crystalline random copolymers of propylene with ethylene and/or with other alpha-olefins (C4-C10), heterophasic copolymers, and blends thereof.

6. The composition of claim 3, comprising an ethylene-based polymer selected from low density polyethylene, linear low density polyethylene, medium density polyethylene, high density polyethylene, very low density polyethylene, ultra-low density polyethylene, ethylene-propylene rubber, ethylene-propylene-diene rubber (EPDM), ethylene-vinyl acetate copolymers, and ethylene-acrylate copolymers, and blends thereof.

7. The composition of claim 1, further comprising additives selected from fillers, antioxidants, lubricants, colorants, plasticizers, extenders, acid scavengers, antistatic agents, and light stabilizers, or combinations thereof.

8. The composition of claim 1, which exhibits low density, high melt strength, high heat resistance, and good mechanical properties.

9. A process for manufacturing a thermoplastic polyolefin composition comprising steps of:
   i) providing a propylene-based polymer and, optionally, an ethylene-based polymer and melting said polymers;
   ii) adding to the molten mixture of step i) an organic silane selected from oligomeric partially hydrolyzed vinyl or allyl substituted alkoxy silanes, and blends thereof in the amount of 0.01 to 5 wt %;
   iii) adding to the molten mixture of step i) a free radical-generating compound selected from organic peroxides, organic nitroxides, and organic compounds containing labile carbon-carbon bonds, or combinations thereof, in an amount of from 0.0005% to 0.5 wt %;
   iv) mixing the molten components at a temperature of between 200 and 290° C., thereby obtaining a thermoplastic polyolefin composition modified by organic silane; and
   v) cooling and pelletizing or shaping the mixture.

10. The process of claim 9, wherein the thermoplastic polyolefin composition comprises 30-99 wt % of propylene-based polymers and 1-70 wt % of ethylene-based polymers, and wherein ethylene-based polymers are at least partially cross-linked by means of organic silane.

11. The process of claim 9, further comprising adding in step iii) crosslinking agents selected from inorganic acids, carboxylic acids, sulfonic acids, and blends thereof.

12. The process of claim 9, further comprising adding in step iv) additives selected from fillers, antioxidants, lubricants, colorants, plasticizers, extenders, acid scavengers, antistatic agents, and light stabilizers.

13. The process of claim 9, wherein the molten mixture of propylene-based polymers and ethylene-based polymers comprises mixed polyolefin waste, selected from post-consumer waste, post-consumer packaging, an industrial production scrap, scrap originating from injection molded parts, from bi-component fibers, and from multilayer films.

14. The process of claim 9, wherein melt mixing of the components is performed continuously using a co-rotating twin-screw extruder.

15. The process of claim 9, wherein step v) comprises extrusion, compression molding, injection molding, thermoforming, fiber spinning, or 3D-printing.

16. The process of claim 11, wherein said inorganic acids, carboxylic acids, sulfonic acids, and blends thereof, are selected from adipic acid, phthalic acid, and boric acid.

17. A thermoplastic polyolefin composition comprising:
   propylene-based polymers;
   0.01-5 wt % of organic oligomeric silanes selected from partially hydrolyzed vinyl or allyl substituted alkoxy silanes, and blends thereof, and
   0.0005-0.5 wt % of a compound capable of generating free radicals; wherein
   said composition is capable of being shaped and repeatedly recycled.

* * * * *